Patented Sept. 4, 1945

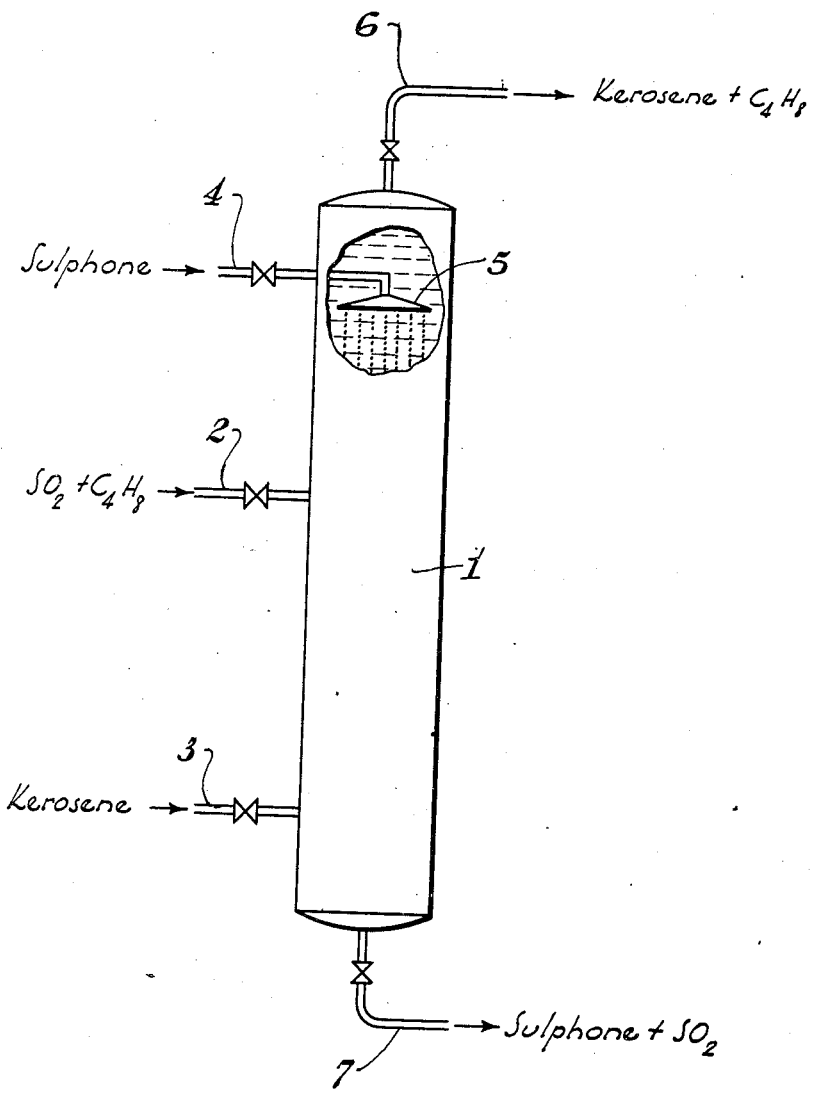

2,384,378

UNITED STATES PATENT OFFICE 2,384,378

SEPARATION OF SULPHUR DIOXIDE AND LOW-BOILING HYDROCARBONS FROM MIXTURES THEREOF

George W. Hooker and Franc A. Landee, Midland, Mich., assignors to The Dow Chemical Company, Midland, Mich., a corporation of Michigan Application November 3, 1941, Serial No. 417,676

4 Claims. (Cl. 23—178)

This invention concerns an improved method of separating sulphur dioxide from mixtures thereof with low boiling aliphatic hydrocarbons, e. g., from aliphatic hydrocarbons containing five or less carbon atoms in the molecule. It particularly concerns the separation of mixtures of sulphur dioxide and conjugated diolefines to recover each in anhydrous and purified form.

Such mixtures of sulphur dioxide and low boiling, e. g., normally gaseous, hydrocarbons are obtained in the known method for recovering diolefines from hydrocarbon mixtures by treatment with sulphur dioxide to form sulphones of the diolefines. For instance, when a mixture of butanes, butylenes, butadiene-1.3, methyl acetylene, ethyl acetylene, and vinyl acetylene, such as is obtainable as a fraction of cracked-oil gas, is treated with sulphur dioxide at a liquefying pressure in accordance with said known method, sulphur dioxide and butadiene react together to form a sulphone, from which a mixture of excess sulphur dioxide and the unreacted hydrocarbons are removed, e. g., by vaporization. The sulphone is then thermally decomposed to form a mixture of sulphur dioxide and butadiene. Other mixtures of sulphur dioxide and low boiling or normally gaseous hydrocarbons are obtained by such treatment of crude cracked-oil gas itself, or other diolefine-containing fractions thereof, e. g., the fraction containing isoprene and other hydrocarbons having five carbon atoms in the molecule, with sulphur dioxide to separate the diolefine from the other hydrocarbons.

Although sulphur dioxide may be removed from such mixtures with low boiling hydrocarbons by scrubbing with water, this is disadvantageous since the aqueous sulphurous acid so-formed is corrosive to usual metal equipment and such procedure necessitates extra steps for drying the sulphur dioxide if the latter is to be re-employed in the process. Because of the corrosiveness of the sulphurous acid formed and the quite low solubility of sulphur dioxide in water, expensive corrosion-resistant equipment of large size is required. Also the heat consumed in vaporizing sulphur dioxide from the dilute aqueous extract adds considerably to the cost of the recovery. Removal of the sulphur dioxide from the sulphur dioxide-hydrocarbon mixtures by distillation is usually not practical since sulphur dioxide distills together, and in many instances forms azeotropes, with one or more of the hydrocarbons usually present.

It is an object of this invention to provide an improved method, whereby sulphur dioxide may be separated from the hydrocarbons in such mixtures more conveniently and economically than by extraction with water, and whereby the sulphur dioxide and the hydrocarbons may each be recovered in substantially anhydrous condition. Another object is to provide such method, whereby the size of extraction equipment required for the production of purified sulphur dioxide at a given rate may be reduced below that required when using water as the extractant. Other objects will be apparent from the following description of the invention.

The invention comprises simultaneously extracting the sulphur dioxide and low boiling hydrocarbon mixture with two extractants, viz., with a liquefied organic sulphone and with a normally liquid paraffin hydrocarbon of boiling point at least 20° C. above that of the low boiling hydrocarbons in the sulphur dioxide-hydrocarbon mixture to be separated. Such extractants are immiscible, or only partially soluble, in one another and have specific gravities which differ sufficiently to permit separation of the same as distinct layers on standing. The liquefied organic sulphones are shown in the co-pending application, Serial No. 290,864, of G. W. Hooker et al., to be exceptionally good solvents or absorbents for sulphur dioxide. They are poor solvents or non-solvents for the low boiling hydrocarbons. On the other hand, the liquid paraffin hydrocarbons are excellent solvents for the low boiling hydrocarbons to be separated from the sulphur dioxide and are non-solvents, or at best only poor solvents, for sulphur dioxide.

Examples of organic sulphones which may be employed in liquefied form as extractants in the process are diethyl sulphone, diisopropyl sulphone, dibutyl sulphone, di-secondary butyl sulphone, 1.4-dithian, di-phenyl sulphone, and the sulphones of the conjugated diolefines such as butadiene-1.3, isoprene, 2-ethyl-butadiene, or 2.3-dimethyl-butadiene, etc. A mixture of such sulphones may, of course, be used, and often with advantage, since such mixture often has a freezing point far below that of any of its components. Although any such liquefied sulphone, or mixture of sulphones, may be employed, the sulphones of the conjugated diolefines are most readily available and are preferred. In the separation of sulphur dioxide from a mixture thereof with a diolefine, a sulphone of the same diolefine is advantageously used as an extractant.

The sulphone extractant may be used in pure form, in which case the extraction must, of course, be carried out at a temperature above its freezing point. If desired, the freezing point of the sulphone may be depressed with any of a variety of agents or solvents, so as to permit its use as a liquid extractant at lower temperatures, e. g., at room temperature. Among the agents suitable for use as freezing point depressants for the sulphones are sulphur dioxide and organic solvents for the sulphones such as acetone, ethyl acetate, benzene, ortho-dichlorobenzene, methyl ethyl ketone, etc.

Examples of liquid paraffinic hydrocarbons, or mixtures of such hydrocarbons, which may be used as the extractant for the low boiling hydrocarbons are hexane, octane, decane, and liquid fractions of petroleum such as gasoline, ligroin, solvent naphtha, kerosene, fuel oil, etc. The extractant is preferably introduced to the extraction in a form free, or nearly so, of normally liquid aromatic or unsaturated hydrocarbons, e. g., benzene, toluene, higher olefines, or higher acetylenes, etc., since the aromatic and unsaturated hydrocarbons are better solvents for sulphur dioxide than are the paraffinic hydrocarbons and their presence in large proportion reduces the selectivity of the extraction. The presence in the extractant of such liquid unsaturated hydrocarbons in amounts less than 20 per cent by weight may be tolerated. In practice, kerosene or solvent naphtha is preferably used as the hydrocarbon extractant.

Although the extraction may be carried out in batch-wise or continuous manner by agitating the sulphur dioxide and low boiling hydrocarbon mixture together with the two extractants in any of the usual ways and thereafter causing the resultant extracts to separate, e. g., by centrifuging or by settling into distinct layers on standing, it is advantageously carried out continuously within an extraction tower.

The accompanying drawing is a diagrammatic sketch of one of the various forms of extractors suitable for use in practicing the invention. In the drawing, the numeral 1 designates an extraction tower which may, but need not, be filled with Raschig rings, or other packing not shown. The tower is provided near its mid-section with an inlet 2 for the sulphur dioxide-hydrocarbon mixture to be separated, and near its lower and upper ends with the inlets 3 and 4 for the less dense and the more dense liquid extractants, respectively. The inlet 4 preferably connects with a spray head 5 or a similar device within the tower for dispersing the denser extractant as fine droplets in the less dense extractant, but such spray head may be omitted. The tower is also provided near its upper end with an outlet 6 for one of the extracts and near its lower end with an outlet 7 for the other extract.

When using kerosene and the liquefied sulphone of butadiene-1.3 as the extractants for the separation of a mixture of sulphur dioxide and butylene into its components, the valve in outlet 7 may be closed and the tower filled to overflowing with kerosene introduced through inlet 3. While continuing the flow of kerosene, liquefied sulphone may be fed into the tower through inlet 4 and spray head 5, whereby it is dispersed as drops which settle downward through the up-flowing kerosene and coalesce as a distinct layer at the bottom of the tower. The valve in outlet 7 is opened sufficiently to permit drainage of the sulphone from the bottom of the tower. The relative rates at which the two extractants are fed into the tower and the sulphone is withdrawn are adjusted so that, except for the limited solubility of each in the other, the kerosene overflowing from the tower through outlet 6 is substantially free of the sulphone and the sulphone withdrawn through the outlet 7 is substantially free of kerosene. Thus, the two extractants are caused to flow countercurrently through the tower. It may be mentioned that the relative rates of flow of the two extractants may be varied widely and still maintain the condition of balance between the flows just described.

After regulating the rates of flow of the extractants, the mixture of sulphur dioxide and butylene is introduced in liquid or vapor form through inlet 2. The relative rates at which the two extractants and said mixture are introduced are regulated in such manner that the kerosene absorbs nearly all of the butylene and the sulphone absorbs nearly all of the sulphur dioxide. The extraction may be carried out at atmospheric pressure or above and at any temperature between that at which the sulphone crystallizes and that at which it is thermally decomposed. Thus, the extraction may satisfactorily be carried out at atmospheric pressure and at room temperature or above, in which case the mixture to be separated is vaporized when first introduced into the tower and the mixed vapors are scrubbed and absorbed by the countercurrent flow of extractants. However, the proportion of sulphur dioxide absorbed in the sulphone and also the proportion of low boiling hydrocarbons absorbed by the kerosene becomes greater as the pressure on the extraction mixture is raised. In practice we prefer to carry the extraction out at temperatures between 65° and 85° C. under a pressure sufficient to liquefy the entire extraction mixture. The pressure required for liquefaction is dependent to a large extent upon the ratios of solutes to solvents, particularly the ratio by weight of sulphur dioxide to sulphone. When this latter ratio is low, e. g., 5 or less, a pressure of 1-2 atmospheres may suffice to liquefy the mixture. When the ratio is higher, e. g., 20 or more, the pressure required for liquefaction may be 5 atmospheres or more. Pressures far higher than those required to liquefy the mixture, e. g., pressures of 20–30 atmospheres or higher, may be employed if desired. By operating under these preferred conditions, the productive capacity of the tower may be increased, due to the increased absorption capacities of the extractants and to avoidance of a vapor phase, and possible crystallization and accumulation of sulphone within the tower may be avoided.

During such extraction with two selective solvents flowing countercurrent to one another, the solution of butylene in kerosene is scrubbed, as it rises in the tower, with a downflow of freshly introduced sulphone which effectively extracts sulphur dioxide therefrom. Likewise, the solution of sulphur dioxide and sulphone is scrubbed, as it descends through the tower, by the upward flow of kerosene which extracts absorbed butylene therefrom. By careful operation a substantially pure solution of butylene and kerosene may be withdrawn continuously through outlet 6 and a solution of sulphur dioxide and sulphone which is substantially free of butadiene may be withdrawn through outlet 7.

The solutes may be recovered from the respective extracts in any of the usual ways, e. g., by vaporization, or by treatment with chemical reagents which react with the solute to form an insoluble derivative of the latter, etc. In practice, absorbed butylene is preferably vaporized, e. g., by raising the temperature and/or lowering the pressure, from the kerosene to leave the latter in condition for recycling in the process. Absorbed sulphur dioxide is likewise preferably vaporized from its solution in the sulphone, leaving the sulphone in condition for recycling. Alternatively, the solution of sulphur dioxide and the sulphone may be cooled to crystallize the sulphone, after which sulphur dioxide may be filtered, decanted or vaporized away from the crystalline sulphone. The sulphur dioxide and butylene are each recovered in a purified or highly concentrated anhydrous form.

The method as just described may be applied in separating sulphur dioxide from its mixtures with other low boiling hydrocarbons. Thus it is effective in recovering sulphur dioxide from the mixtures thereof with low boiling paraffinic, olefinic, or acetylenic hydrocarbons which are often obtained as unreacted materials in the production of sulphones. It may also be applied with advantage in separating sulphur dioxide and diolefines from the mixtures thereof which are produced by the thermal decomposition of corresponding sulphones, e. g., the sulphone of butadiene-1.3 or of isoprene.

The following examples describe certain ways in which the principle of the invention has been applied, but are not to be construed as limiting its scope.

Example 1

A vertical extraction tower of 6 inch internal diameter and 20 feet in height and having inlets 2, 3, and 4, spray head 5, and the outlets 6 and 7 indicated in the accompanying drawing was filled with a hydrocarbon extractant consisting of equal parts by volume of kerosene and solvent naphtha, which extractant was pumped into the tower through inlet 3 at a temperature of 70° C. and overflowed through outlet 6. While continuing flow of the hydrocarbon extractant, the liquefied sulphone of butadiene-1.3 was introduced in steady flow under pressure and at a temperature of 80° C. through inlet 4 and spray head 5. A crude liquefied reaction mixture consisting of 37.8 per cent by weight of the sulphone of butadiene-1.3, 39.5 per cent of sulphur dioxide, 20.8 per cent of butylene and 1.9 per cent of butadiene-1.3 was pumped under pressure into the tower through inlet 2. The valves in outlets 6 and 7 were opened sufficiently to permit continuous withdrawal of the hydrocarbon extract and the sulphone extract, respectively, and yet maintain the mixture within the tower under a pressure of about 200 pounds per square inch, gauge. The rates at which the several materials were pumped into the tower were 0.24 gallon per minute of the hydrocarbon extractant through inlet 3, 0.15 gallon per minute of the liquefied sulphone through inlet 4, and 2.5 pounds per minute of the liquefied reaction mixture through inlet 2. The pressure on the sulphone extract was reduced to approximately atmospheric pressure as it flowed from the tower through outlet 7 and it was at the same time heated to about 95° C., whereby the absorbed gases were vaporized therefrom and collected. The gas thus collected contained 91.8 per cent by volume of sulphur dioxide and 8.2 per cent of normally gaseous hydrocarbons, principally butylene. The pressure on the hydrocarbon extract was reduced to about 40 pounds per square inch as it flowed from the extraction tower through outlet 6 and, while under said pressure, the dissolved low boiling hydrocarbons were vaporized therefrom by heating the extract to 140° C. The gas thus obtained was 96.5 per cent by volume hydrocarbons, principally butylene, and contained only 3.5 per cent of sulphur dioxide.

Example 2

A liquefied mixture of sulphur dioxide and butadiene-1.3, produced by the thermal decomposition of the purified sulphone of butadiene, has been continuously and simultaneously extracted with the liquefied sulphone of butadiene and with kerosene, the procedure in carrying out the extraction and in recovering the sulphur dioxide and butadiene from the resultant extracts being similar to that described in Example 1. The extraction and subsequent vaporization operations are readily carried out to recover the anhydrous sulphur dioxide and the butadiene each in a form of 96 per cent purity or higher.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method for separating sulphur dioxide from a normally gaseous mixture thereof with at least one low boiling aliphatic hydrocarbon having not more than 5 carbon atoms in the molecule, the steps which consist in passing a normally liquid paraffinic hydrocarbon extractant upwardly through a tower and a liquefied organic sulphone extractant downward through the tower counter to the liquid paraffinic hydrocarbon, while at the same time passing said mixture of sulphur dioxide and the low boiling hydrocarbon into the tower at a point where the extractants are in counterflow to one another, the mixture within the tower being at a superatmospheric pressure sufficient to liquefy the same, whereby sulphur dioxide is selectively absorbed by the sulphone and the low boiling hydrocarbon is selectively absorbed by the paraffinic hydrocarbon extractant and the resultant extracts are caused to separate from one another.

2. In a method for separating sulphur dioxide from a mixture comprising the same and a butylene, the steps which consist in passing a normally liquid fraction of petroleum and a liquefied sulphone of a conjugated diolefine through a tower in counter flow to one another while at the same time introducing said mixture comprising sulphur dioxide and the butylene into the tower at a point where the liquefied sulphone and the liquid petroleum fraction flow counter to one another, the mixture within the tower being at a superatmospheric pressure sufficient to liquefy the same, whereby sulphur dioxide is selectively absorbed by the sulphone and butylene is absorbed by the liquid petroleum fraction and the resultant extracts are caused to separate from one another, and vaporizing the solute from at least one of the extracts so obtained.

3. In a method for separating sulphur dioxide from a mixture thereof with a conjugated diolefine having not more than 5 carbon atoms in the molecule, the steps which consist in introducing said mixture into a tower at a point near the mid-section of the latter while introducing a normally liquid fraction of petroleum into the tower at a point near the lower end of the same and introducing and dispersing a liquefied sulphone of a conjugated diolefine at a point near the top of the tower and restricting flow of liquids from the tower so that the mixture within the same is under a superatmospheric pressure sufficient to maintain the same in liquid form, and during said operations continuously withdrawing the resultant extract comprising the liquid petroleum fraction and the conjugated diolefine from the upper portion of the tower and continuously withdrawing the resultant extract comprising the liquefied sulphone and sulphur dioxide from a lower portion of the tower and vaporizing the solute from at least one of the extracts so obtained.

4. In a method of separating sulphur dioxide from a mixture thereof with butadiene-1.3, the steps which consist in passing said mixture under a superatmospheric pressure sufficient to liquefy the same into a dispersion of a liquefied sulphone of butadiene-1.3 in a normally liquid fraction of petroleum while causing said liquefied sulphone and said petroleum fraction to flow counter to one another, whereby sulphur dioxide is selectively absorbed by the liquefied sulphone and butadiene-1.3 is selectively absorbed by the liquid petroleum fraction and the resultant extracts are caused to separate from one another, and vaporizing the solute from at least one of the extracts so obtained.

GEORGE W. HOOKER.
FRANC A. LANDEE.